J. J. VAN IDERSTINE.
VEHICLE WHEEL.
APPLICATION FILED FEB. 25, 1913.
1,080,128.
Patented Dec. 2, 1913.
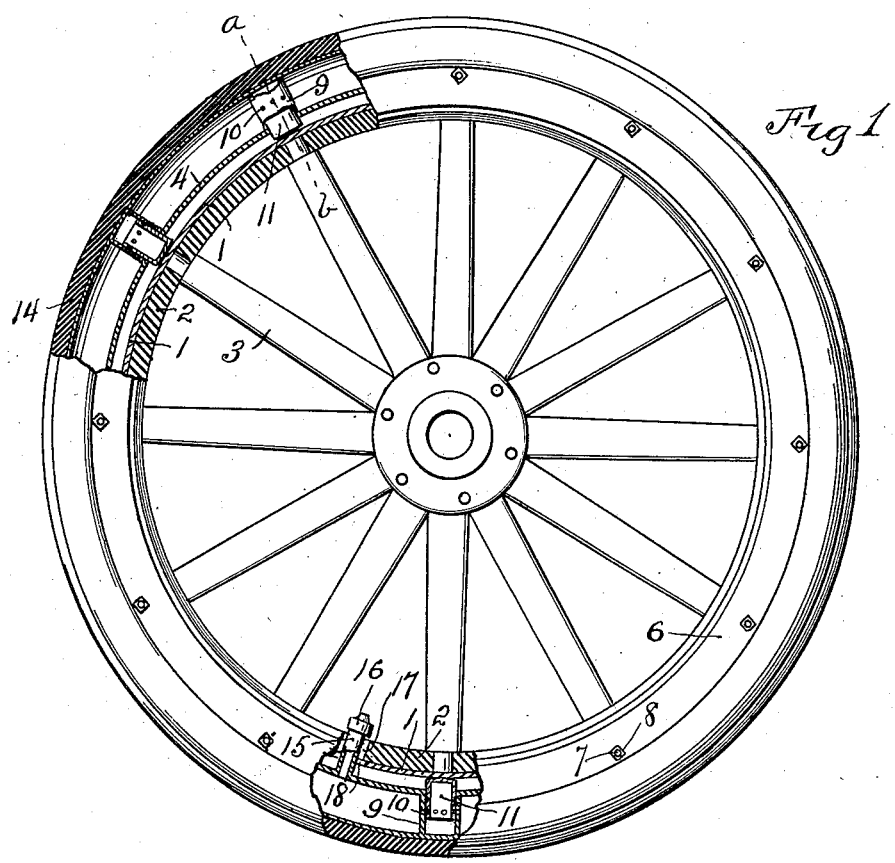
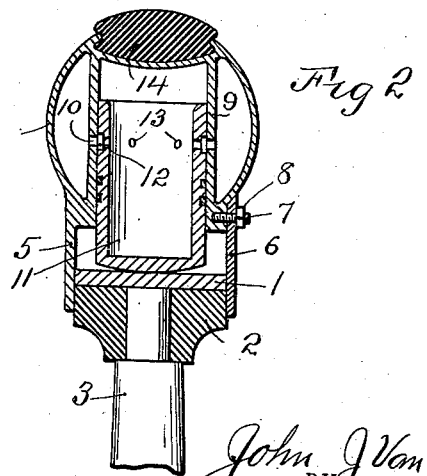
WITNESSES:
R. C. Hamilton
E. B. House.
INVENTOR.
John J. Van Iderstine
BY Warren D. House
His ATTORNEY.
COLUMBIA PLANOGRAPH CO., WASHINGTON, D. C.

UNITED STATES PATENT OFFICE.

JOHN J. VAN IDERSTINE, OF KANSAS CITY, MISSOURI.

VEHICLE-WHEEL.

1,080,128. Specification of Letters Patent. Patented Dec. 2, 1913.

Application filed February 25, 1913. Serial No. 759,495.

*To all whom it may concern:*

Be it known that I, JOHN J. VAN IDERSTINE, a citizen of the United States, residing at Kansas City, in the county of Jackson and State of Missouri, have invented certain new and useful Improvements in Vehicle-Wheels, of which the following is a specification.

My invention relates to improvements in vehicle wheels.

The object of my invention is to provide a device which may be quickly and securely attached to an ordinary vehicle wheel and which will have the advantages of an inflatable pneumatic tire, but which cannot be punctured.

The novel features of my invention are hereinafter fully described and claimed.

In the accompanying drawing I have illustrated the preferred form of my invention.

Figure 1 is a side view, partly in elevation and partly in vertical section, of a vehicle wheel, provided with my improvement. Fig. 2 is an enlarged cross section, on the line *a—b* of Fig. 1.

Similar reference characters designate similar parts in the different views.

1 designates the felly band of an ordinary vehicle wheel, 2 the felly and 3 the spokes thereof.

Encircling the felly band 1 is a detachable rim comprising an annular tubular body 4, encircling, but spaced apart from the felly band 1, and having an inwardly extending annular flange 5, disposed at one edge of the felly band. At the other edge of the felly band is a ring 6, secured to the body 4, by any suitable means, such as bolts 7, mounted in the body 4 and extending laterally therefrom through the ring 6, and having mounted thereon nuts 8, which bear against the outside of the ring 6.

The body 4 is provided with radial tubular guides 9, which are closed at their outer ends, have open inner ends, and are provided each with a lateral opening 10, which communicates with the interior of the body 4.

Slidably mounted respectively, in guides 9, are pistons 11, which are preferably tubular and provided with closed inner ends, which are slidably mounted on the felly band 1, and which have open outer ends, as is best shown in Fig. 2. Each piston 11 is provided with a peripheral groove 12, which is adapted to register with the adjacent opening 10 when the piston is slid to a predetermined position in the guide 9. One or more lateral openings 13, which communicate with the groove 12, are provided in each piston 11.

The periphery of the body 4 may be provided with an annular groove in which may be mounted a yielding rubber tread or tire 14. Said groove may be of the clencher type, with inwardly turned side walls for engaging the tire 14.

For filling the body 4 with compressed air, it is provided with an inwardly extending filling tube 15, which extends through the felly band 1 and felly 2, the inner end of the filling tube being provided with the usual detachable cap 16.

In the operation of my invention, the parts having been assembled as described, with the grooves 12 in register with the openings 10, air is pumped into the body 4, through the tube 15, thereby filling the tube 4, guides 9 and pistons 11, with compressed air. When the felly band 1 moves downwardly, the lower pistons 11 will move downwardly, thereby cutting off the connection between the interior of the body 4 and the interior of the tubular guide 9. Any further movement downward will be resisted by the air in the guide 9 and piston 11, being further compressed, inasmuch as it cannot escape through the openings 10. The compressed air in the upper pistons will force them inwardly so that they are kept in contact with the felly band 1.

As shown in Fig. 1, the felly 2 is provided with a longitudinal slot 17, through which the filling tube 15 extends. The felly band 1 is similarly provided with a longitudinal slot 18. These slots are of sufficient length to permit vertical movement of the felly band 1, when the tube 15 is disposed horizontally.

I do not limit my invention to the structure shown and described, as modifications, within the scope of the appended claim, may be made without departing from the spirit of my invention.

Having thus described my invention, what I claim and desire to secure by Letters Patent is:—

In a vehicle wheel, a band, a rim encircling the band and having an annular tubular body provided with radial tubular guides, each having a lateral opening communicating with the interior of said body, and pistons slidably mounted respectively in said guides, each piston being tubular and having an open outer end and a closed inner end, the closed end being slidably mounted on said band, each piston having a peripheral opening adapted to register with the opening in the guide in which the piston is mounted when the piston is moved to a pre-determined position, each guide being closed at its outer end and open at its inner end.

In testimony whereof I have signed my name to this specification in presence of two subscribing witnesses.

JOHN J. VAN IDERSTINE.

Witnesses:
WARREN D. HOUSE,
E. B. HOUSE.

Copies of this patent may be obtained for five cents each, by addressing the "Commissioner of Patents, Washington, D. C."